United States Patent [19]

Hollister et al.

[11] 4,340,655

[45] Jul. 20, 1982

[54] THERMAL AND MECHANICAL BARRIER LAYERS FOR OPTICAL RECORDING ELEMENTS

[75] Inventors: Kenneth R. Hollister, Pittsford; Harold T. Thomas, Rochester, both of N.Y.

[73] Assignee: Eastman Kodak Company, Rochester, N.Y.

[21] Appl. No.: 160,809

[22] Filed: Jun. 18, 1980

[51] Int. Cl.³ ........................ G03E 1/76; G01D 15/10; G11B 7/24

[52] U.S. Cl. ...................................... 430/14; 430/292; 430/348; 430/346; 430/338; 430/523; 430/536; 430/945; 430/961; 346/1.1; 346/76 L; 346/135.1; 346/107 R; 369/284; 430/11; 430/140; 430/273; 358/129

[58] Field of Search ................... 430/11, 14, 348, 523, 430/536, 273, 292, 297, 323, 945, 961, 346, 338, 271; 346/76 L, 1.1, 135.1; 369/284

[56] References Cited

U.S. PATENT DOCUMENTS

| | | | |
|---|---|---|---|
| 3,716,844 | 2/1973 | Brodsky | 430/945 X |
| 3,740,761 | 6/1973 | Fechter | 346/135.1 |
| 3,990,084 | 11/1976 | Hamisch | 430/945 X |
| 4,000,492 | 12/1976 | Willens | 346/135.1 X |
| 4,064,205 | 12/1977 | Landsman | 430/348 X |
| 4,069,487 | 1/1978 | Kasai et al. | 346/76 L |
| 4,101,907 | 7/1978 | Bell et al. | 346/135.1 |

FOREIGN PATENT DOCUMENTS 2061543 5/1981 United Kingdom .

OTHER PUBLICATIONS

Bartolini et al., "Materials for Optical Recording", RCA Labs., Aug., 1977.

Hanley, The Condensed Chemical Dictionary, Eighth Edition, 1971, pp. 14, 15, 180, 181, 621, 795, 706, 712, 714.

Grant, Hackh's Chemical Dictionary, Fourth Edition, 1969, p. 141.

*Primary Examiner*—Jack P. Brammer

*Attorney, Agent, or Firm*—John R. Everett

[57] ABSTRACT

Improved thermal and mechanical barrier layers coated on the recording layer of an optical recording element are disclosed. The improved layers comprise water-soluble polymers having a glass transition temperature when dry of at least 100° C. and preferably at least 150° C. These barrier layers are easily coated and do not significantly degrade the performance of the element. Optional layers such as spacer layers and topcoat layers coated on the barrier layers are also disclosed.

18 Claims, 4 Drawing Figures

30

20

10

THERMAL AND MECHANICAL BARRIER LAYERS FOR OPTICAL RECORDING ELEMENTS

FIELD OF THE INVENTION

The present invention relates to the use of certain polyers as thermal and mechanical barrier layers in optical recording elements. The thermal and mechanical barrier layers of the present invention are capable of being coated from aqueous coating compositions, are compatible with the recording layer of an optical recording element and have excellent thermal and mechanical barrier properties.

DESCRIPTION OF THE PRIOR ART

Elements for recording information by thermally deforming the recording layer are known. These elements are useful in providing for rapidly recording large amounts of digital information in a small area. These elements provide for a method of optically recording video information which is read back with a high signal-to-noise ratio (SNR). A large variety of recording layers are useful in these elements. For example, thin metal layers such as layers of bismuth and titanium have been suggested. Vacuum-deposited organic dye layers, inorganic oxides and chalcogen compounds have also been suggested for the recording layer.

Recording of an optical recording element is accomplished by a beam of high energy-density radiation, usually a laser beam. The laser beam is focused onto the surface of the recording layer of the element. The recording layer absorbs energy from the laser beam so that a small portion of the layer burns, evaporates or is otherwise displaced from these portions. This technique of optical recording on a heat-deformable recording layer is usually referred to in the art as "ablative recording". Normally, there is continuous relative motion between the laser beam and the layer so that, as the laser is pulsed or modulated, discrete deformations of varying sizes are created in the layer. The sizes and spacing of these deformations constitute the encoded information. One element of this type is commonly referred to in the art as an "optical video disc".

It has recently been discovered that deformations result in information which is capable of being read using a reading beam which is not substantially absorbed by the recording layer. Because the reading beam is not absorbed by the recording layer, it is possible to use a higher-power laser read beam which, in turn, provides a comparatively high signal-to-noise ratio output. The recording layers of these particularly advantageous elements most often comprise a dye and a binder, preferably an organic solvent-soluble binder. Recording elements of this type are described in copending, commonly assigned U.S. applications Ser. Nos. 23,434 filed Mar. 23, 1979, by Thomas and Wrobel, 124,382 filed Feb. 25, 1980, by Specht and Thomas, and 124,381 filed Feb. 25, 1980, by Howe and Wrobel.

It is known in the art to provide a thermal and mechanical barrier layer over the recording layer of an ablative-type optical recording element. The purpose of this thermal and mechanical barrier layer is to protect the recording layer from defects such as scratches, dirt and fingerprints. Another function of the thermal and mechanical barrier layer is to prevent the material which is vaporized from the recording layer from depositing on the optical system and other components of the recording apparatus. Still another function of the thermal and mechanical barrier layer is to retain the heat which is generated in the recording layer by the writing beam.

Many materials have been proposed for the thermal and mechanical barrier layer which is coated on the recording layer of an ablative-type optical recording element. Bartolini et al in "Materials for Optical Recording" in a final report for Contract MDA904-76-C-0429 for the National Security Agency, August, 1977, reported experiments with a wide variety of overcoat materials. (See also U.S. Pat. No. 4,101,907.) Both organic and inorganic overcoat candidates were tested. The organic materials were hydrophobic, low-molecular-weight materials which could be applied by evaporation or other solventless deposition techniques. Two of the organic materials produced hazy, nontransparent films and could not be tested. Other of the organic materials crystallized after evaporation onto the recording layer and also could not be tested. Many of the samples were incapable of containing the ablated recording layer which resulted in ruptures of the overcoat layer which, in turn, produced reduced signal-to-noise ratio and a large increase in signal dropouts. The only organic overcoat which was moderately successful was a low-melting-point (88° C.) sucrose benzoate. However, even this best organic overcoat seriously degraded (about 10 db) the signal-to-noise ratio on playback. Another overcoat which was tested was a layer of RTV-615 TM. (RTV-615 is a silicone rubber available from General Electric Corporation.) The recording characteristics of the ablative-type optical recording element which was overcoated with this silicone rubber showed a substantial reduction in playback signal-to-noise ratio compared with an uncoated disc.

The best thermal and mechanical barrier layer disclosed by Bartolini et al. is a layer of evaporated silicone dioxide. However, even this layer causes several problems. For example, a silicone dioxide barrier layer is very brittle and spontaneously cracks in some cases, thereby producing defects in the layer. Further, it is difficult to control the thickness of the silicone dioxide layer during vacuum evaporation and it is necessary to employ special techniques to monitor the thickness. Still further, vacuum evaporation of a silicone dioxide layer or other refractory material onto a previously deposited recording layer, particularly an organic-solvent-coated recording layer, it not only expensive but impractical in a large-scale manufacturing operation.

In U.S. Pat. No. 4,069,487 to Kasai et al., there is described an ablative-type optical recording element having a protecting layer which is not destroyed by the recording laser beam. Useful protecting layers are either organic or inorganic and include the silicone dioxide layers disclosed as being useful by Bartolini et al. Organic polymers disclosed as being useful include those of the solvent "evaporation solidifying type" and those of the "catalyst curing type". Representative polymers of the "evaporation solidifying type" include nitrocellulose resins, acetyl cellulose resins, poly(vinyl chloride) resins, polycarbonate resins, saturated polyester resins, polystyrene resins and acrylic resins. All of these resins are hydrophobic and are soluble only in organic solvents. Further, resins falling within these groups have a wide variety of properties. For example, both acrylic and polyester polymers could have glass transition temperatures as low as −45° C. or lower.

None of the examples in this patent discloses the performance of any of the recorded optical recording elements in terms of the signal-to-noise ratio of the output signal.

It is also known to overcoat other types of recording elements with various protective materials. Thus, overcoats have been provided for the various types of optical recording elements and other types of high information-density elements such as capacitance-type video discs. A characteristic which most of these overcoats share is that they must be applied after the record has been made. It will be readily apparent that these overcoats are generally not useable with ablative-type recording elements. The overcoat for an ablative-type element must not drastically increase the power necessary to record information and must not seriously reduce the playback SNR.

It is apparent that there has been a continuing need for improvements in the thermal and mechanical barrier layers for ablative-type optical recording elements, i.e., those elements having thermally deformable recording layers. It is highly desirable that these layers be easily and inexpensively coated, for example, without the need for expensive vacuum-evaporation techniques. It is particularly desirable that the thermal and mechanical barrier layer could be coated on the particularly desirable dye and organic solvent-soluble binder recording layers without adversely affecting such layers.

SUMMARY OF THE INVENTION

The present invention provides easily and inexpensively coatable barrier layers having excellent thermal and mechanical properties. The optical recording elements according to the present invention include a thermal and mechanical barrier layer comprising a water-soluble polymer having a glass transition temperature ($T_g$) when dry of at least 100° C. In particularly preferred embodiments, the recording element of the present invention comprises the described thermal and mechanical barrier layer coated on a recording layer which comprises a dye and an organic solvent-soluble binder. It is also useful to provide the described barrier layer between the recording layer and the support, particularly where the support has a layer which is a good heat conductor, i.e., a reflective layer.

The water-soluble polymeric barrier layers described herein are capable of being easily and economically coated on the recording layer and yet produce a tough and flexible barrier. Further, elements of the invention exhibit only a slight degradation in performance compared with an element not having the protective barrier layer. For example, the increase in the useful recording power is generally only a factor of about 1.5 and the decrease in playback SNR is generally only about 3 to 5 db. Thus, the high $T_g$, water-soluble barrier layers exhibit performance characteristics similar to a refractory barrier layer without the coating expense and brittleness of the refractory.

Thus, in one aspect of the present invention there is provided an improved recording element comprising a support having thereon a heat-deformable optical recording layer and, coated on the recording layer, a substantially transparent thermal and mechanical barrier layer, the improvement wherein the barrier layer comprises a water-soluble polymer having a $T_g$ when dry of at least 100° C. and preferably at least 150° C.

In many cases, it is desirable that the outermost surface of the recording element be sufficiently removed from the recording layer so that defects on the surface such as scratches, dust and fingerprints do not interfere with the recording and reading processes. Thus, in accordance with another aspect of the present invention there is provided a recording element as described above, also comprising a spacer layer of a transparent composition coated on the barrier layer so that the combined thickness of the barrier layer and the spacer layer is greater than about 0.1 mm. It is preferred that this spacer layer be substantially water-impermeable so that water is prevented from reaching the water-soluble thermal and mechanical barrier layer, thereby decreasing its glass transition temperature.

DETAILED DESCRIPTION OF THE INVENTION

Figure 1:
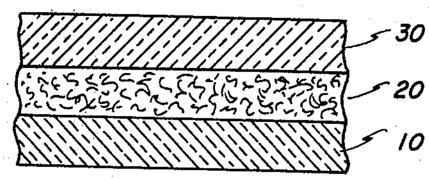
FIGS. 1–4 are schematic illustrations of various embodiments of the invention.

The present invention provides an improved optical recording element having a thermal and mechanical barrier layer. By "thermal barrier" is meant that the layer is capable of resisting the flow of heat generated in the recording layer during the recording process. By "mechanical barrier" is meant that the layer is capable of remaining intact, i.e., unruptured, during the recording process. Barrier layers comprised of a water-soluble polymer having a $T_g$ when dry of at least 100° C. meet these requirements.

The polymers which are useful as the barrier layers in the elements of the present invention must be water-soluble. By "water-soluble" is meant that it is possible to dissolve enough of the polymer in water so as to form a coating solution which is at least about one weight percent of the polymer. For the purposes of the present invention, a polymer is considered useful if it is water-soluble prior to coating. Thus, water-soluble polymers which are capable of being rendered insoluble after coating, such as by crosslinking, are useful in the described barrier layers.

The barrier layers must comprise a polymer having a $T_g$, when dry, greater than 100° C. The $T_g$ is measured by means which are well-known in the art. The $T_g$ of some water-soluble polymers is somewhat dependent upon the water content of the polymer. It has been found that useful barrier polymers have a $T_g$ in excess of 100° C. when dry, that is, when the $T_g$ is measured on a substantially dehydrated or desiccated sample.

Particularly preferred barrier layers comprise polymers having a $T_g$ greater than about 150° C. This higher $T_g$ provides for still further improvement in the threshold power requirements and playback SNR.

The described thermal and mechanical barrier layers must be substantially transparent. By "transparent" is meant that the layer has little or no absorption at the wavelength of the reading or writing beam wavelength. It further means that the layer is clear, i.e., substantially free from haze-causing defects such as crystals and reticulated surfaces.

The thermal and mechanical barrier layers of the optical recording elements of the present invention need only be thick enough to avoid rupturing during the recording process. Thicknesses on the order of 1500 Å are usually sufficient to provide this barrier. Greater thicknesses of the water-soluble barrier layer are also useful.

Useful water-soluble polymers for the thermal and mechanical barrier layer include addition and condensation polymers. Both homo- and copolymers are useful. The polymers are derived from monomers which impart water solubility or high glass transition temperature or both of these properties to the polymer. Polymers having mixtures of various water-solubility-imparting or high-$T_g$-imparting monomers are also useful. So long as the polymers contain sufficient water-solubility-imparting monomers and sufficient high-glass-transition-temperature-imparting monomers to provide the described solubility and glass-transition-temperature characteristics, the remainder of the polymer optionally comprises any other monomer or monomers. The other monomer or monomers are optionally included to provide other properties such as coatability, flexibility, tensile strength and clarity.

The following addition polymerizable monomers are included in the polymer to impart water solubility, high $T_g$ or both. Either the acid or salt form of certain of the monomers is useful, the salt form generally being preferred because the salt form generally increases the water solubility and $T_g$ of the dried layers in comparison with the acid form.

2-ethoxycarbonylallylsulfuric acid, sodium salt
4-acryloyloxybutane-1-sulfonic acid, sodium salt
3-acryloyloxy-1-methylpropane-1-sulfonic acid, sodium salt
acrylic acid
citraconic acid
chlorofumaric acid
chloromalic acid
α-chloroacrylic acid
3-acryloyloxypropionic acid
β-acryloyloxyethyl monophosphate
potassium 3-acryloyloxypropyl phosphate
potassium 2-acryloyloxyethyl phosphate
4-t-butyl-9-methyl-8-oxo-7-oxa-4-aza-9-decene-1-sulfonic acid
methacrylic acid
mono(2-methacryloyloxyethyl) phosphate
potassium 3-methacryloyloxypropyl phosphate
mono(3-methacryloyloxypropyl) phosphate
ethylenesulfuric acid, sodium salt
fumaric acid
3-acrylamido-3-methylbutanoic acid
bis(3-sodiosulfopropyl) itaconate
itaconic acid
maleic acid
mesaconic acid
2-acryloyloxyethylsulfuric acid, sodium salt
2-methacryloyloxyethylsulfuric acid, sodium salt
pyridinium 2-methacryloyloxyethylsulfate
3-acrylamidopropane-1-sulfonic acid, potassium salt
ammonium (8-methacryloyloxy-3,6-dioxaoctyl)sulfate
p-styrenesulfonic acid, sodium salt
vinylphenylmethanesulfonic acid, sodium salt
3-methacryloyloxypropane-1-sulfonic acid, sodium salt
3-methacryloyloxypropane-1-methyl-1-sulfonic acid, sodium salt
4-methacryloyloxybutane-1-sulfonic acid, sodium salt
2-methacryloyloxyethyl-1-sulfonic acid, sodium salt
2-acrylamido-2-methylpropanesulfonic acid
3-methacryloyloxypropane-1-sulfonic acid, zinc salt
3-acryloyloxypropane-1-sulfonic acid, sodium salt
methacrylic acid, sodium salt
lithium methacrylate
N-[3-(N-phenylsulfonyl-N-sodiosulfamoyl)phenyl]acrylamide
N-[2-(N-phenylsulfonylsulfamoyl)ethyl]acrylamide
N-[3-(N-methylsulfonyl-N-sodiosulfamoyl)phenyl]methacrylamide
N-(m- and p-vinylbenzyl)iminodiacetic acid
2-methacryloyloxyethyl-1-sulfonic acid
ammonium p-styrenesulfonate
sodium o- and p-styrenesulfonate
potassium o- and p-styrenesulfonate
2-acrylamido-2-methylpropanesulfonic acid, sodium salt
N-(3-acrylamidopropyl)ammonium methacrylate
N-(2-methacryloyloxyethyl)-N,N,N-trimethylammonium p-toluenesulfonate
1,2-dimethyl-5-vinylpyridinium methosulfate
N-(2-methacryloyloxyethyl)-N,N,N-trimethylammonium bromide
N-(2-methacryloyloxyethyl)-N,N,N-trimethylammonium chloride
N-(2-hydroxy-3-methacryloyloxypropyl)-N,N,N-trimethyl ammonium sulfate
N-(2-methacryloyloxyethyl)-N,N,N-trimethylammonium nitrate
N-(2-methacryloyloxyethyl)-N,N,N-trimethylammonium phosphate
N-(2-methacryloyloxyethyl)-N,N,N-trimethylammonium methosulfate
N-(2-hydroxy-3-methacryloyloxypropyl)-N,N,N-trimethyl ammonium chloride
N-vinylbenzyl-N,N,N-trimethylammonium chloride
N-(3-acrylamido-3,3-dimethylpropyl)-N,N,N-trimethylammonium methosulfate
3-methyl-1-vinylimidazolium methosulfate
N-(3-methacrylamidopropyl)-N-benzyl-N,N-dimethylammonium chloride
N-(3-methacrylamidopropyl)-N,N,N-trimethylammonium chloride
N-(2-acryloyloxyethyl)-N,N,N-trimethylammonium methosulfate
N-(2-methacryloyloxyethyl)-N,N-dimethyl-N-benzylammonium chloride
4,4,9-trimethyl-8-oxo-7-oxa-4-azonia-9-decene-1-sulfonate
3-(2-methyl-5-vinylpyridino)propylsulfonate acrylamide
N-methacryloyl-N'-glycylhydrazine hydrochloride
N-methyl-2-aminoethyl methacrylate hydrochloride
N-methylolacrylamide
N-(m- and p-vinylbenzyl)-N,N-dimethylamine
2-phenyl-1-vinylimidazole
N-isopropylacrylamide
2-methyl-1-vinylimidazole
1-vinylimidazole
N-methylmethacrylamide
methacrylamide
maleimide
N-(2-aminoethyl)methacrylamide hydrochloride
N-(3-aminopropyl)methacrylamide hydrochloride
N-(2-amino-2-methylpropyl)methacrylamide, methacrylic acid salt
acrylonitrile
N,N-dimethylmethacrylamide
N-methylacrylamide
2-ureidoethyl vinyl ether
N-methacryloyl-N'-ureidoacetylhydrazine
N-vinyl-N'-(2-hydroxyethyl)succinamide
2-methyl-5-vinylpyridine 2-vinylpyridine
4-vinylpyridine
N-isopropylmethacrylamide
N,N-dimethylacrylamide Crosslinking reduces the water solubility of polymers useful for coating; however, crosslinking of the polymers after coating with a crosslinking agent often beneficially increases the $T_g$ of the coated layers. Certain of the heterocyclic nitrogen-containing polymers are capable of being crosslinked after coating by treatment with metal ions. For example, poly(2-methyl-1-vinylimidazole) is crosslinked after coating by zinc ion. The polymers optionally have incorporated therein monomers having crosslinkable or "hardenable" groups. Preferably less than about 30 weight percent of such monomers are incorporated in the addition polymers useful in the invention. Examples of such crosslinkable monomers include:

acryloylacetone
2-acetoacetoxypropyl methacrylate
N-(2-acetoacetoxyethyl)acrylamide
m-methacrylamidophenol
m-acrylamidophenol
N-(methacryloyloxyethyl)acetoacetamide
2-acetoacetoxyethyl methacrylate
N-(3-acetoacetamidopropyl)methacrylamide
N-cyanoacetyl-N'-methacryloylhydrazine
glycidyl methacrylate
glycidyl acrylate Examples of water-soluble, high-$T_g$ addition polymers useful as thermal and mechanical barrier layers in accordance with this invention are given below.

poly(acrylic acid)
poly(sodium acrylate)
poly(methacrylic acid)
poly(sodium methacrylate)
poly(2-acrylamido-2-methylpropanesulfonic acid, sodium salt
poly(styrenesulfonic acid, sodium salt)
poly(2-sulfoethyl methacrylate, sodium salt)
poly(3-acryloyloxypropane-1-sulfonic acid, sodium salt)
poly(2-methyl-1-vinylimidazole)
poly(1-vinylimidazole)
poly(acrylamide)
poly[3-(2-methyl-5-vinylpyridinio)propylsulfonate]
poly(3-methyl-1-vinylimidazolium methosulfate)
poly(1-vinylimidazole-co-acrylic acid) $(1:2)_{wt}$
poly[N-(2-methacryloyloxyethyl)-N,N,N-trimethylammonium chloride]
poly[1-vinylimidazole-co-3-(2-hydroxyethyl)-1-vinylimidazolium chloride] $(75/25)_{wt}$
poly(2-methyl-1-vinylimidazole-co-3-benzyl-2-methyl-1-vinylimidazolium chloride) $(50/50)_{wt}$
poly(acrylamide-co-2-methyl-1-vinylimidazole) $(50/50)_{wt}$
poly(potassium 2-acryloyloxyethyl phosphate)
poly(ethylenesulfuric acid, sodium salt)
poly(potassium 2-acryloyloxyethyl phosphate)
poly(vinylphenylmethanesulfonic acid, sodium salt)
poly(4-methacryloyloxybutane-1-sulfonic acid, sodium salt)
poly(2-methacryloyloxyethylsulfuric acid, sodium salt)
poly{N-[3-(N-phenylsulfonyl-N-sodiosulfamoyl)-phenyl]acrylamide}
poly{N-[3-(N-methylsulfonyl-N-sodiosulfamoyl)-phenyl]methacrylamide}
poly(ammonium p-styrenesulfonate)
poly[N-(2-methacryloyloxyethyl)-N,N,N-trimethylammonium p-toluenesulfonate]
poly(1,2-dimethyl-5-vinylpyridinium methosulfate)
poly(N-vinylbenzyl-N,N,N-trimethylammonium chloride)
poly(3-methyl-1-vinylimidazolium methosulfate)
poly[N-(2-acryloyloxyethyl)-N,N,N-trimethylammonium methosulfate]
poly[N-(2-methacryloyloxyethyl)-N,N-dimethyl-N-benzylammonium chloride]
poly(N-methylolacrylamide-co-2-methyl-1-vinylimidazole) $(25/75)_{wt}$
poly(sodium 2-acrylamido-2-methylpropane-1-sulfonate-co-N-isopropylacrylamide) $(1/1)_{wt}$
poly(methacrylamide-co-sodium methacrylate) $(1/1)_{mt}$
poly[N-(2-amino-2-methylpropyl)methacrylamide, methacrylic acid salt]
poly[N-(2-acryloyloxyethyl)-N,N,N-trimethylammonium chloride-co-2-methyl-5-vinylpyridine] $(2/1)_{wt}$
poly(acrylonitrile-co-sodium acrylate) $(30/70)_{wt}$
poly[2-acetoacetoxyethyl methacrylate-co-N-isopropylacrylamide-co-sodium 2-acrylamido-2-methylpropanesulfonate] $(10/45/45)_{wt}$
poly(m-acrylamidophenol-co-2-methyl-1-vinylimidazole $(15/85)_{wt}$
poly[acrylamide-co-N-(3-acetoacetamidopropylmethacrylamide-co-sodium 2-acrylamido-2-methylpropane-1-sulfonate] $(70/25/5)_{wt}$
poly(glycidylacrylate-co-sodium-3-acryloyloxypropyl-1-sulfonate) $(7.5/92.5)_{wt}$ Condensation polymers, such as polyesters, polycarbonates, polyurethanes, polyamides and mixed polyesteramides, often have higher glass transition temperatures than addition polymers. Monomers which are incorporated into polyesters, polyamides, polycarbonates, etc., to impart water solubility are those having the structures:

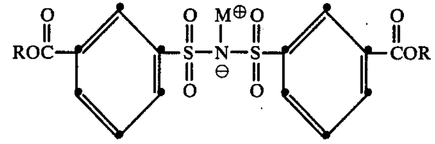

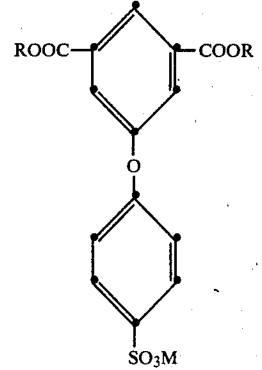

-continued

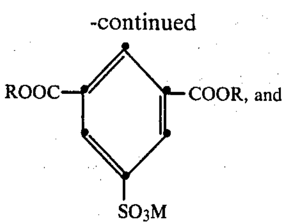

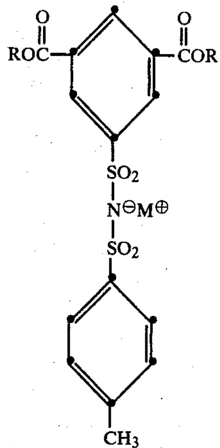

wherein:

M is ammonium or a monovalent metal and each R is hydrogen, alkyl, aryl or halogen.

Monomers which are incorporated into useful condensation polymers to produce high $T_g$ include aromatic diols and aromatic dicarboxylic acids or their functional equivalents, e.g., halide, esters or anhydrides, such as phthalic acid, isophthalic acid and terephthalic acid. Particularly effective monomers are those described in U.S. Pat. No. 4,190,446, column 5, line 19, to column 8, line 43.

Exemplary condensation polymers useful in the invention include:

poly(4,4'-isopropylidenediphenylene 3,3'-sodioiminosulfonyldibenzoate)

poly[4,4'-(hexahydro-4,7-methanoindan-5-ylidene)-diphenylene 5-sodiosulfo-1,3-phenylenedicarboxylate]

poly(1,8-dimethylxanthylium-3,6-diyl chloride terephthalate)

poly[1,1'-spirobiindan-5,5'-ylene 5-(N-potassio-p-tolylsulfonamidosulfonyl)-1,3-benzenedicarboxylate]

poly[4,4'-isopropylidenediphenylene 3,3'-sodiominodisulfonyldibenzoate-co-terephthalate (75:25)]

poly[4,4'-isopropylidenebis(3,5-dichlorophenylene) 5-(4-sodiosulfophenoxy)-1,3-dibenzoate]

poly[4,4'-isopropylidenebis(3,5-dimethylphenylene-co-4,4'-(hexahydro-4,7-methanoindan-5-ylidene)diphenylene (50:50) 3,3'-sodioiminodisulfonyldibenzoate-co-5-sodiosulfo-1,3-phenylenedicarboxylate (50:50)]

The described thermal and mechanical barrier layers comprising the water-soluble polymers are capable of being coated using a wide variety of techniques. Useful methods include spray coating, air-knife coating, whirl coating, doctor-blade coating and slide-hopper coating. After coating, the barrier is dried, usually at elevated temperatures. The dried and, if necessary, crosslinked layers should have a glass transition temperature greater than about 100° C. In order to achieve this glass transition temperature with certain water-soluble polymers, it is necessary to remove a substantial amount of the water in this drying step. Usually, the dried layer will have less than about 4 weight percent water.

The thermal and mechanical barrier layer of the optical recording elements of the present invention are coated on the heat-deformable optical recording layer (or layers) of the element. A heat-deformable layer is any layer which is capable of undergoing thermal deformation when exposed to a beam of high energy-density radiation such as a laser beam. Deformations have been referred to in the art as pits, craters, depressions and cavities. Useful layers include thin vacuum-evaporated layers of metal such as bismuth, rhodium, titanium and platinum. Layers of vacuum-evaporated dyes are also useful, such as those described in U.S. Pat. No. 4,190,843 to Spong issued Feb. 26, 1980. Bilayer and trilayer optical interference films are also useful. Useful recording layers also include chalcogenides such as those described in U.S. Pat. No. 4,069,487 to Kasai et al. and solvent-coated dye-binder layers.

Preferred recording layers are dye-binder layers having an absorption factor greater than 20. Particularly preferred are layers wherein the binder is soluble in an organic solvent. Such layers are capable of being coated easily and economically. "Absorption factor" is defined as the extinction coefficient of the dye in the dye-binder composition divided by the molecular weight of the dye and multiplied by the weight percent of the dye in the coated layer. When layers of this type are recorded upon with a beam of high energy-density radiation, a deformation is formed which is capable of being read by a beam of high energy-density radiation which is not significantly absorbed by the recording layer. One would have expected that placing a thermal and mechanical barrier layer over such a recording layer would interfere with the formation of the proper type of deformation. It has been unexpectedly found, however, that the thermal and mechanical barrier layer of a water-soluble, high-$T_g$ polymer does not interfere with the formation of this type of deformation. Optical recording elements having recording layers with a high absorption factor are described by Thomas and Wrobel, U.S. Ser. No. 23,434 filed Mar. 23, 1979, and Specht and Thomas, U.S. Ser. No. 124,382 filed Feb. 25, 1980. An optimized optical recording element of this type is described by Howe and Wrobel, U.S. application Ser. No. 124,381 filed Feb. 25, 1980.

Depending upon the desired mode of reading the optical recording element of the present invention, the support for the element is either reflective or transparent. In the case of a reflective support, both sides of the support are optionally reflective and a recording layer, along with its associated thermal and mechanical barrier layer, is coated on both sides of the support. The support itself is any of a wide variety of materials including glass, a self-supporting plastic such as poly(ethylene terephthalate), cellulose acetate, poly(methyl methacrylate), poly(vinyl chloride) and polystyrene, or a metal such as an aluminum sheet. It is desirable that the support have a relatively high melting point in order to avoid deformation of the support during recording. The support is desirably very smooth to minimize noise and dropouts in the recording-playback process. In certain preferred embodiments, the support is coated with a smoothing layer prior to the coating of the reflective surface and the other layers of the optical recording element described herein.

The composition which is used for the smoothing layer is preferably low-viscosity, polymerizable fluid which is coated on the surface of the support. Following coating, polymerization of the fluid produces a microsmooth surface on the support. The support is then made reflective by vacuum metalization of the smooth surface such as by evaporating aluminum onto the smoothed surface of the support. In preferred embodiments, the polymerizable fluid comprises photopolymerizable monomers. Preferably, the monomers or mixtures of monomers are low-viscosity fluids in the absence of a solvent. Useful polymerizable fluid compositions are described in U.S. Pat. Nos. 4,092,173 and 4,171,979.

The thermal and mechanical barrier layer is optionally coated with a spacer layer. The function of the spacer layer is to place any defects which are formed on the surface of the element beyond the plane of focus of the recording and playback beam. While the water-soluble, high-$T_g$ polymers of the present thermal and mechanical barrier layer are capable of being coated in thick layers so as to provide this function in a single overcoat layer, it is desirable to overcoat these water-soluble polymers with a water-impermeable polymer so that the element is resistant to the effects of humidity in the environment. Further, a spacer overcoat is capable of being optimized for other desirable surface properties. Particularly useful spacer overcoat layers include water-impermeable polymers such as cyclized polyisoprene, poly(butylene), neoprenes, RTV TM silicones, linear aliphatic polyurethanes and photohardenable monomer or polymer compositions. The spacer overcoat layer is coated in a single operation to provide a combined thickness of the barrier and spacer layers of at least about 0.1 mm, or the spacer overcoat is built up by successive coatings to provide such a thickness.

The spacer layer or barrier layer is optionally overcoated with a topcoat layer to provide an outermost surface having desirable properties. For example, an antistatic layer is optionally coated on the spacer layer or barrier layer. Illustrative useful antistatic layers include layers containing soluble salts such as chloride, nitrate and similar water-soluble salts; insoluble organic salts such as those described by Trevoy in U.S. Pat. Nos. 3,245,833 and 3,428,451; and polymers having ionic groups such as those described by Kelley and Campbell, U.S. Pat. No. 4,070,189; to illustrate but a few. The outermost topcoat layer optionally contains other addenda such as waxes to provide abrasion resistance and agents to reduce the buildup of static electricity.

The thermal and mechanical barrier layer and the spacer or topcoat layers optionally contain other addenda such as antioxidants, UV absorbers, coating aids and hardeners.

FIG. 1 illustrates an embodiment of an optical recording element within the scope of the present invention. There is provided a support 10 having coated thereon an optical recording layer 20 and a thermal and mechanical barrier layer 30. In this embodiment, the support 10 is substantially transparent and, after the element has been written upon, the element is read by passing a reading beam through the thermal and mechanical barrier layer, the recording layer and the support to a sensor (not shown) positioned underneath the support.

Figure 2:
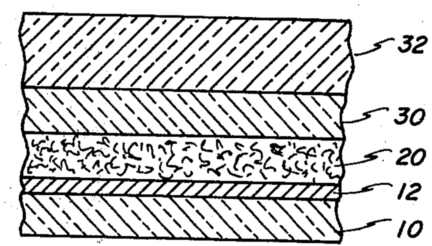

FIG. 2 illustrates another embodiment of an optical recording element of the invention. This embodiment is similar to the embodiment of FIG. 1 except that there has been provided a reflective layer 12, between the support and the recording layer, and a spacer layer 32 over the barrier layer. After this element has been recorded upon, it is read by passing a reading beam through the spacer layer 32, the thermal and mechanical barrier layer 30 and the recording layer 20. The reading beam reflects off of the reflective layer 12 and is detected by a detector (not shown) which is positioned on the same side of the support as the described layers.

Figure 3:
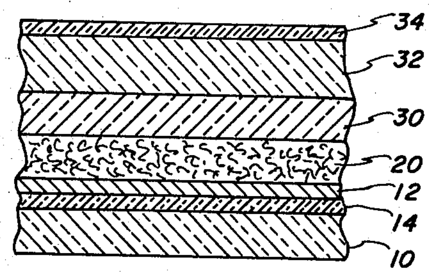

FIG. 3 illustrates yet another embodiment of the invention. In addition to the previously described layers, there are provide a smoothing layer 14 between the support and the reflective layer 12, and an outermost topcoat layer 34 which contains, for example, an antistatic agent.

Figure 4:
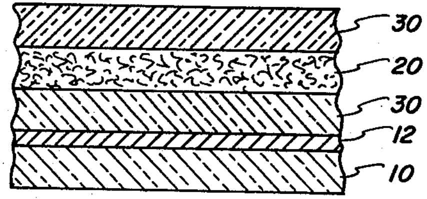

FIG. 4 illustrates an embodiment of the present invention wherein the thermal and mechanical barrier layer 30 is used to isolate the recording layer 20. In addition to the thermal and mechanical barrier layer 30 which is coated over the recording layer, there is provided a second thermal and mechanical barrier layer 30 coated between the recording layer 20 and the reflective layer 12. This second thermal and mechanical barrier layer protects the support from damage caused by the heating of the recording layer 20 during the recording process and minimizes heat loss to the reflective layer during the recording process.

It will be readily appreciated that the figures are intended to represent only the general composition and orientation of the layers and are not drawn to scale.

The following examples are presented.

EXAMPLES 1-3

Basic recording element

A 110-mm-diameter circular glass substrate was whirl-coated with a surface-smoothing composition by flooding the glass substrate with the smoothing composition at low rpm (about 80-100 rpm) and then leveling the coating by advancing the speed to about 500 rpm. The surface-smoothing composition comprised:

| | |
|---|---|
| pentaerythritol tetraacrylate | 20 g |
| a low-viscosity urethane-acrylate monomer (UV-curable Topcoat 874-C-2002 TM, Fuller O'Brien Corp) | 20 g |
| 2-ethoxyethanol | 60 g |
| a coumarin sensitizer composition | 3 g |
| surfactant | 3 drops |

The coated and dried surface-smoothing composition was cured by irradiating with a 3000-watt pulsed xenon arc lamp at 18 in for 4 min.

The thus smoothed surface of the substrate was then coated with a 500-Å-thick reflecting layer of aluminum by vapor deposition.

A recording layer was whirl-coated on the reflecting layer by flooding the reflecting layer with the dye-binder composition at low rpm and then leveling the coating at about 1300 rpm. The dye-binder composition was formed by dissolving 1 g of cellulose nitrate and 1 g of the dye 2,5-bis(4-diethylaminobenzylidene)cyclopentanone. After drying, the disc was ready for use/overcoating.

EXAMPLE 1

Basic recording element protected with a thermal/mechanical barrier layer of this invention A recording element prepared as described above was overcoated with poly(2-methyl-1-vinylimidazole) by spin-coating a 9.2% solution of the polymer in water onto the disk at 240 rpm. The thickness of the resulting layer was 1500 Å.

EXAMPLE 2

Basic recording element protected with a thermal/mechanical barrier layer overcoated with cyclized polyisoprene spacer layer A recording element prepared as described in Example 1 was overcoated with cyclized polyisoprene (CPI) by spin-coating an 8.4% solution of the polyisoprene in xylene at 240 rpm. The thickness of the spacer layer was about 2 μm.

EXAMPLE 3

Basic recording element protected with a thermal/mechanical barrier layer overcoated first with cyclized polyisoprene and then with a photohardened topcoat An element prepared as described in Example 2 was overcoated with a photohardened topcoat by spin-coating a photohardenable composition onto the disk at 335 rpm to produce a layer about 0.13 mm thick and cured by exposing the coating to a 3000 W pulsed xenon arc lamp at about 12 in for about 80 sec.

The photohardenable composition was as follows:

| | Weight % |
|---|---|
| (a) Cargill X8-1030-47™ Urethane Polymer (Cargill, Inc.) | 65.0 |
| (b) Urethane 788™ Urethane Polymer (Thiokol Chem Corp) | 12.9 |
| (c) Chemlink 100™ Monomer (Ware Chemical Co) | 8.6 |
| (d) hexamethylene diacrylate | 9.5 |
| (e) 4,4'bis(chloromethyl)benzophenone | 3.8 |

The basic disc and the discs of Examples 1–3 were evaluated by recording information in the recording layer using an argon-ion laser light beam (488 nm) focused with a numerical aperture NA=0.525 while the disc was rotating at 1800 rpm. Several power levels were used with each disc. The recorded information was read back using a similarly focused helium-neon laser light beam (633 nm). The SNR of the readout for each sample is tabulated below.

| | Write Power (mw) | | | | |
|---|---|---|---|---|---|
| Sample | 400 | 600 | 800 | 1000 | 1250 |
| basic disc | 44 | 50 | 51 | 53 | |
| Example 1 disc | 34 | 39 | 46 | 49 | 50 |
| Example 2 disc | 34 | 38 | 43 | 49 | 49 |
| Example 3 disc | 36 | 45 | 47 | 48 | 49 |

EXAMPLE 4

Example 1 was repeated except that the thermal/mechanical barrier layer was poly(sodium 2-acrylamido-2-methylpropanesulfonate). The power requirements and SNR on readout of the resulting disc were similar to Example 1.

COMPARATIVE EXAMPLE

The basic disc described above was overcoated with an 8-μm layer of cyclized polyisoprene. Up to a write power of 1250 mw, the SNR on readout was less than 20 db.

Although the invention has been described in considerable detail with particular reference to certain preferred embodiments thereof, variations and modifications can be effected within the spirit and scope of the invention.

We claim:

1. In a recording element comprising a support having thereon a heat-deformable optical recording layer and, coated on said recording layer, a substantially transparent thermal and mechanical barrier layer, the improvement wherein said barrier layer comprises a water-soluble polymer having a $T_g$ when dry of at least 100° C.

2. A recording element according to claim 1 wherein said polymer has a $T_g$ of at least 150° C.

3. A recording element according to claim 1 wherein said polymer is an addition polymer.

4. A recording element according to claim 1 wherein said polymer is a condensation polymer.

5. A recording element according to claim 1 wherein said polymer is selected from the group consisting of poly(sodium 2-acrylamido-2-methylpropanesulfonate), poly(2-methyl-1-vinylimidazole), poly(1-vinylimidazole), poly(styrenesulfonic acid, sodium salt) and poly(acrylamide).

6. A recording element according to claim 1 wherein said barrier layer polymer is crosslinked.

7. A recording element according to claim 1 wherein said barrier layer has a thickness of at least 1500 Å.

8. A recording element according to claim 1 comprising a spacer layer of a transparent composition coated on said barrier layer so that the combined thickness of said barrier layer and said spacer layer is greater than about 0.1 mm.

9. A recording element according to claim 8 wherein said spacer layer is water-impermeable.

10. A recording element according to claim 1 comprising an antistatic layer coated on said barrier layer.

11. A recording element according to claim 8 comprising an antistatic layer coated on said spacer layer.

12. A recording element according to claim 8 wherein said spacer layer comprises cyclized polyisoprene.

13. In a recording element comprising a reflective support having coated thereon a heat-deformable optical recording layer comprising a dye and an organic solvent-soluble binder and a substantially transparent thermal and mechanical barrier layer, the improvement wherein said barrier layer comprises a water-soluble polymer having a $T_g$ when dry of at least 100° C.

14. A recording element according to claim 13 wherein said polymer has a $T_g$ of at least 150° C.

15. A recording element comprising a plastic support having coated thereon, in sequence, a surface-smoothing layer, a reflective layer, a recording layer comprising a dye and an organic solvent-soluble binder and a substantially transparent thermal and mechanical barrier layer, wherein said barrier layer comprises a water-soluble polymer having a $T_g$ when dry of at least 100° C.

16. A recording element according to claim 15 wherein said polymer is selected from the group consisting of poly(sodium 2-acrylamido-2-methylpropanesulfonate), poly(2-methyl-1-vinylimidazole), poly(1-vinylimidazole), poly(styrenesulfonic acid, sodium salt) and poly(acrylamide).

17. A recording element comprising a support having thereon, in sequence, a reflective layer, a substantially transparent thermal and mechanical barrier layer, a heat-deformable optical recording layer and a substantially transparent thermal and mechanical barrier layer, wherein said barrier layers comprise a water-soluble polymer having a $T_g$ when dry of at least 100° C.

18. In a recorded element comprising a support having coated thereon a heat-deformable optical recording layer having deformations therein and, coated on said recording layer, a substantially transparent thermal and mechanical barrier layer, the improvement wherein said barrier layer comprises a water-soluble polymer having a $T_g$ when dry of at least 100° C.

* * * * *